A. A. GAMBLE AND W. A. WATKINS.
TRUCK.
APPLICATION FILED MAR. 21, 1919.
1,360,208. Patented Nov. 23, 1920.
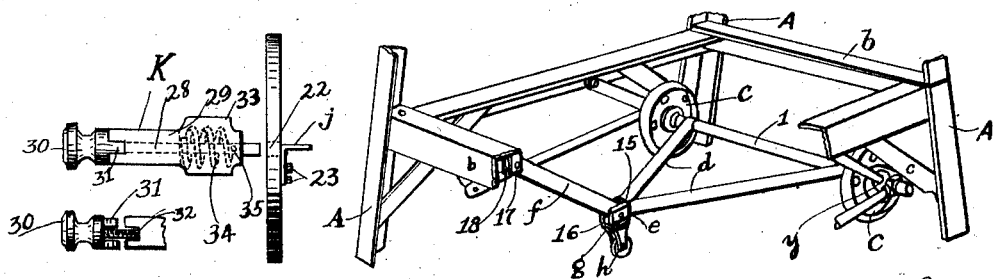
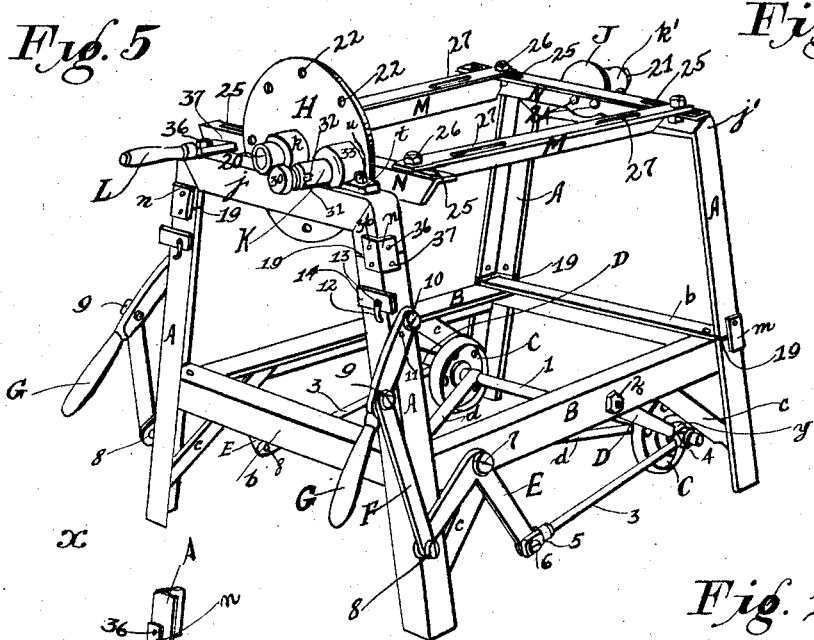
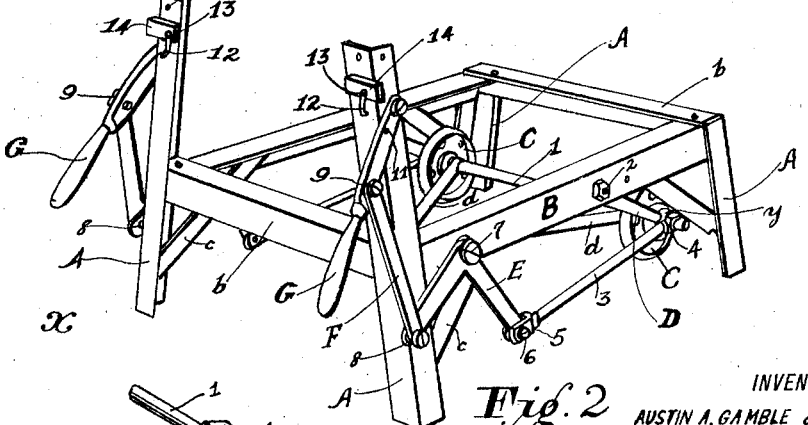
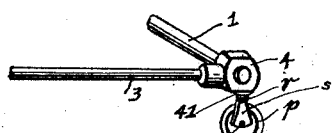
INVENTORS,
AUSTIN A. GAMBLE & Wm A. WATKINS;
BY
ATTORNEY

UNITED STATES PATENT OFFICE.

AUSTIN A. GAMBLE, OF ARTESIA, AND WILLIAM A. WATKINS, OF LOS ANGELES, CALIFORNIA.

TRUCK.

1,360,208.   Specification of Letters Patent.   Patented Nov. 23, 1920.

Application filed March 21, 1919. Serial No. 284,119.

*To all whom it may concern:*

Be it known that we, AUSTIN A. GAMBLE and WILLIAM A. WATKINS, both citizens of the United States, residing, respectively, at Artesia and Los Angeles, in the county of Los Angeles and State of California, have jointly invented new and useful Improvements in Trucks, of which the following is a specification.

This invention relates to trucks, and more particularly to trucks for use in automobile garages, etc., and has for its object to provide a suitable means of accommodating and transporting automobile motors, machinery, etc. from place to place for the purpose in the case of automobile motors, of repairing same, refitting or replacement of parts or features thereof.

With the above and other objects in view, the invention consists in the novel and useful provision, formation, combination, association and relative arrangement of parts, members and features, all as hereinafter described, shown in the drawing and finally pointed out in claims.

In the drawing:

Figure 1 is an isometric view of the entire trucking device;

Fig. 2 shows the lower part of the trucking device shown in Fig. 1, with the top portion removed;

Fig. 3 is a fragmentary isometric view of the chassis;

Fig. 4 is an alternative method providing casters in place of wheels for the truck; and, Fig. 5 is a detail longitudinal sectional view of locking means for holding the perforated disk which controls the rotation of the motor frame to any desired position.

Corresponding parts in all the figures are designated by the same reference characters.

Referring with particularity to the drawing, the truck X comprises a suitable supporting frame A joined at determined distances by means of beams B, there being attached to said beams wheel members C by connecting arms D. L designates a bell crank and F a link, and G lever arms. H and J designate disks and K locking means, L a locking lever, and M and N designate machinery supporting frames.

The wheels C are held in position by an axle 1. Connected to this axle are supporting arms D provided with journaled fittings $y$ around the axle 1, and the arms D in turn are connected to the beams B by means of bolts 2. In order to throw the wheels C into a position in which they will support the truck X, there are provided rods 3 with journaled boxes and bearings 4 surrounding said axle and shown, but not necessarily so, on the outside of the wheels C. These rods 3 have at their opposite ends knuckle joints or clevises 5. The bell cranks E have one end held in position in said knuckle joints 5 by means of pins or bolts 6. The apexes of said bell cranks E are held to the beams B by means of bolts 7 and the other end of the bell cranks E are loosely held to the links F by pins 8. The links F in turn join the levers G by means of pins 9, and the levers are held to the frame A by bolts 10. The links F are connected to the levers G in such a manner that there is provided a lever arm action between the connecting pins 9 and the pins 10. This is in order that an upward movement of the arms G will result in pulling the links $f$ directly upward, which in turn revolves the bell cranks E about their pins 7 and pulls the rods 3 longitudinally, thus causing the connecting arms D holding the wheels C to rotate and bring the latter into the position in which they will operate. The levers G are further provided with perforations 11 and when the levers G are in an operative position, that is, a position in which the wheels C are also in an operative position, small links with pin heads 12 may be forced into the perforations 11, thus holding the arms G in fixed position.

The pin head links 12 are pivotally supported by means of pins 13 passing through stopping arms 14 and connected to the frame A. These stopping arms 14 tend to prevent the levers G from passing a predetermined position.

The supporting frame A, as before mentioned, is held in spaced position by the beams B, and the side frame members $b$. To prevent any looseness of construction arms $c$ are provided at the corners connected with the supporting frame A and the beams B.

Connected to the axle 1 are rods $d$. These rods meet at a point 15 and have connected to said point a yoke $e$. The arm $f$ has eye perforations at each end, and through these perforations a pin 16 is passed through the yoke $e$, and the arm $f$ is in turn connected at its opposite end by means of a pin 17 to a clevis 18, which clevis is connected at a median point of the cross bar or beam b and at the under side of same, that is to say, the beams as well as the frames provided in the truck are made in channeled formation in the form of L. This construction readily allows bolts, etc., to be fastened thereto on the under side of said L formation and preserves the external appearance of the truck so that it is pleasing to the eye. The yoke e supports a swivel bogie g and this bogie in turn allows a caster h to revolve around same. Thus when the wheels C are in operative position the arms d are moved in relation thereto, thus forcing the arm f to a vertical position, or nearly vertical position, and this causes the caster h to come into position and operate in conjunction with the wheel members C. Thus the truck is supported at three different points, and may be readily pushed from place to place.

The frame A is divided at the upper portion, as at 19, so that the top half may be removed for the reasons stated in the objects of this invention, the top half of said frame A carrying the means for pivotally supporting any motor or the like upon which the work is to be done.

Supporting elements are arranged on the horizontal members j and j' of the frame A and at a median section of the horizontal sections j and j' are journal boxes k and k' which contain axle members 20 and 21. The axle member 20 is rigidly connected to the disk H at its center point. This disk has spaced perforated portions 22 adjacent to its periphery. The disk H is rigidly attached to the supporting frame N by means of bolts 23. The opposite member k' likewise holds a disk J connected by means of bolts 24 which rigidly hold said disk J to the member N. As will be noted the two cross members N are identical, and both disks are identical with the exception that J is much smaller and is not perforated. The members N are provided with slotted guides 25, and in these slotted members 25 are slidable bolts 26, which connect the members N and the longitudinal members M between same. These longitudinal members, or the engine supporting frame, as they were previously called, are likewise provided with slots 27. As will be noted these slots are of any determined length, depending upon the uses to which this truck may be put, and they may extend if necessary longitudinally of said members N and M the entire length thereof. The slots in the member M are provided for the express purpose of holding the bolts which pass through the lugs on any engine, that is, any engine used in a gas car or portable steam engine, said lugs being connected to the frame thereof. In order to prevent the members N and M from rotating when an uneven load is placed thereon or when an engine or any other piece of machinery has been bolted thereto, to allow said engine or machinery to be revolved into an operable position and held there, the locking means K is provided, said locking device having horizontal lugs (2) held by bolts (w) to the frame j. This locking means has a locking pin 28 passing through a suitable fitting 29, and the locking pin 28 is of sufficient length and has at one end thereof a head section 30. This head section is provided with forks or lugs 31, said forks or lugs engaging with notched portions 32 of the fitting 29. This fitting member 29 has an enlarged head 33 and in said head is a coil spring 34 which is connected near one end by means of a pin 35 to the locking pin 28. The locking pin end, that is, the end that does not contain the head 30, normally engages in one of the perforations 22 of the disk H, but when it is desired to rotate the disk H and its attendant members connected thereto, the locking pin may be withdrawn from said perforations 22 by pulling outwardly upon the head 30. As the locking pin 28 is connected to this head 30 and the forks 31 are disengaged from the notch 32, said head 30 may be revolved as shown in the fragmentary section of Fig. 5. This of course compresses the spring 34 and upon releasing the head 30 it springs into a neutral position, allowing the disk H to be revolved to any desired position. Upon again turning the head 30 the forks 31 will engage the notch 32 and effectively stop the disk from rotating when a perforation 22 is reached. When the members N and M are in a horizontal position a further locking means is provided by means of the locking lever L, which is fastened to the top surface of the frame j by means of a bolt 36. The knife edge of the locking lever L revolves around this bolt 36 and into a slot 37 provided on the vertical side of the member M, that is, that side which is connected to the disk H.

If it is desired to remove the parts j and j' with their attendant features, it will be noted that there are channel iron pieces n and m rigidly connected to j and j' by any suitable means such as bolts 36. As will be observed these channel irons are placed upon the outside of the frame members A and are for the purpose of acting as guides, inasmuch as the end of the frame members A will abut against each other at the divided portions 19. If a more rigid support is desired pins may be passed through the holes 37 and both frame members rigidly held together, although it is not believed that this will be necessary.

In place of using the wheel members C an alternative method is provided, as shown in Fig. 4 in which casters *p* are provided. These casters are held by suitable yokes *s* to swivel bogies *r* and pin connections 41 between the members 4 and the yoke *s*. Pins 40 connect the yokes *s* through the hubs of the casters *p*. A plurality of casters may be used along the axle 1 if desired.

While we have hereinbefore specifically described our invention and its several features only with reference to the particular embodiments thereof, which are illustrated in the drawing, it will be understood that the invention is in principle equally applicable to any form of vehicle, and further, that it can be variously modified in its various details, within the scope of the appended claims, without departing from the spirit or sacrificing the advantages thereof.

Having thus disclosed our invention, we claim and desire to secure by Letters Patent:

1. A device of the character described, including an upright supporting frame, a horizontal axle extending under one end of the frame, wheels carried by the axle, swinging links connecting the frame and axle and permitting the wheels to be moved into and out of operative position, handles pivotally connected to the opposite end of the frame and adapted to be swung outwardly into operative position or collapsed against the frame, an operative connection between the handles and the wheels whereby the handles and wheels are simultaneously moved into and out of operative position, and a caster wheel operatively connected to the hand levers so as to be moved into and out of operative position thereby.

2. A device of the character described, including an upright supporting frame, a substantially horizontal axle extending under one end of the frame, wheels carried by the axle, swinging links connecting the frame and axle and permitting the axle to be moved to bring the wheels into and out of operative position, a single caster wheel at the opposite end of the frame and at an intermediate point between the sides thereof, a swinging arm carrying the auxiliary caster wheel, converging links connecting the wheel to the ends of the axle whereby the caster wheel is moved simultaneously with the other wheels, hand levers mounted upon the frame and adapted to be collapsed against the same or swung outwardly into operative position, and means for automatically moving the axle downwardly into operative position when the hand levers are swung outwardly.

In testimony whereof, we have signed our names to this specification in the presence of two subscribing witnesses.

AUSTIN A. GAMBLE.
WILLIAM A. WATKINS.

Witnesses:
J. CALVIN BROWN,
WILLIS S. MITCHELL.